United States Patent

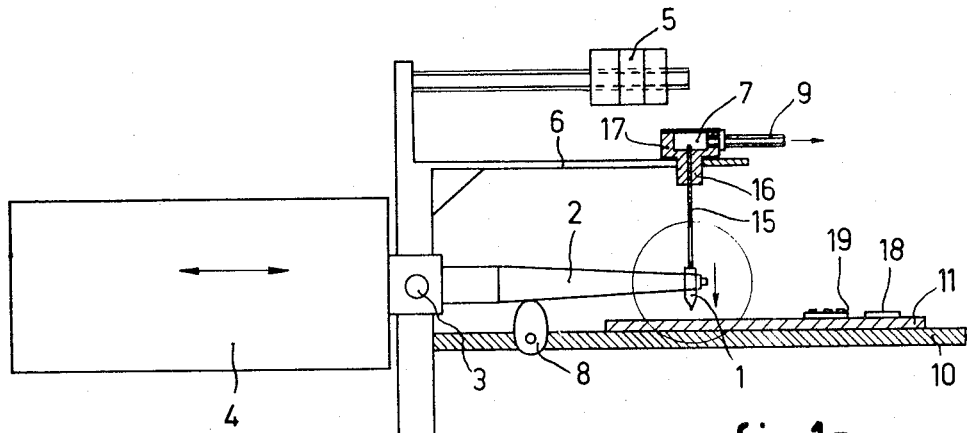
fig.1a
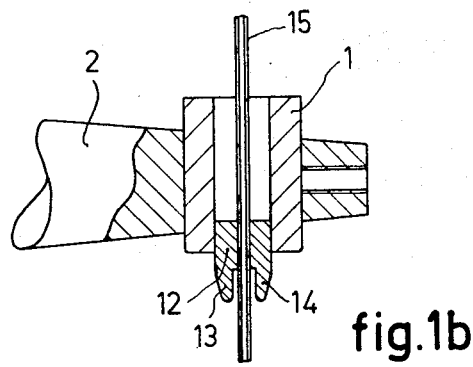
fig.1b
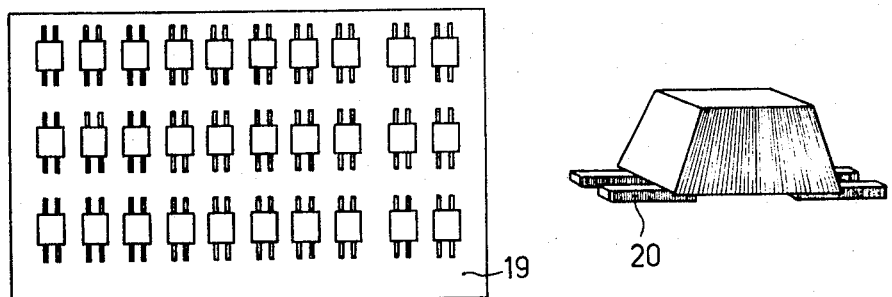
fig.2a
fig.2b
INVENTOR.
JOSEPH J.J. FASTRE

[11] 3,628,716

[72] Inventor Joseph Jules Jacques Fastre
    Evere Brussels, Belgium
[21] Appl. No. 799,812
[22] Filed Feb. 17, 1969
[45] Patented Dec. 21, 1971
[73] Assignee U.S. Phillips Corporation
    New York, N.Y.
[32] Priority Feb. 16, 1968
[33] Netherlands
[31] 6802279

[54] ULTRASONIC WELDING DEVICE WITH A SUCTION ROD FOR TREATING MICROSEMICONDUCTOR BLOCKS
    8 Claims, 7 Drawing Figs.
[52] U.S. Cl. .................................................. 228/1,
    156/73, 29/470.1
[51] Int. Cl. ...................................................... B23k 1/06,
    B23k 5/20
[50] Field of Search .......................................... 156/73;
    228/1, 4, 3; 29/470.1, 471.1, 200, 497

[56] References Cited
UNITED STATES PATENTS

| | | | |
|---|---|---|---|
| 3,201,864 | 8/1965 | Jones | 228/1 |
| 3,382,564 | 5/1968 | Gallentine | 228/4 |
| 3,440,118 | 4/1969 | Obeda | 228/1 |
| 3,464,102 | 9/1969 | Soloff | 156/73 |
| 3,477,119 | 11/1969 | Smith | 228/1 |

Primary Examiner—John F. Campbell
Assistant Examiner—Donald P. Rooney
Attorney—Frank R. Trifari ABSTRACT: An ultrasonic welding device that includes a welding rod with an axial channel extending to the welding tip. A hollow needle is slidably supported within the channel so that one end extends beyond the end of the welding tip. When a force is exerted on the exposed end of the needle it is retracted into the channel. The other end of the needle is coupled to a suction pump or the like. The welding rod is movable relative to a work support and an ultrasonic generator vibrates the welding rod.

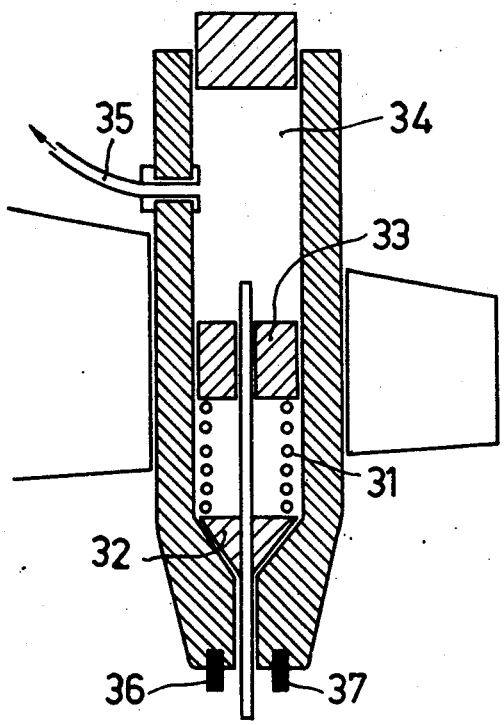

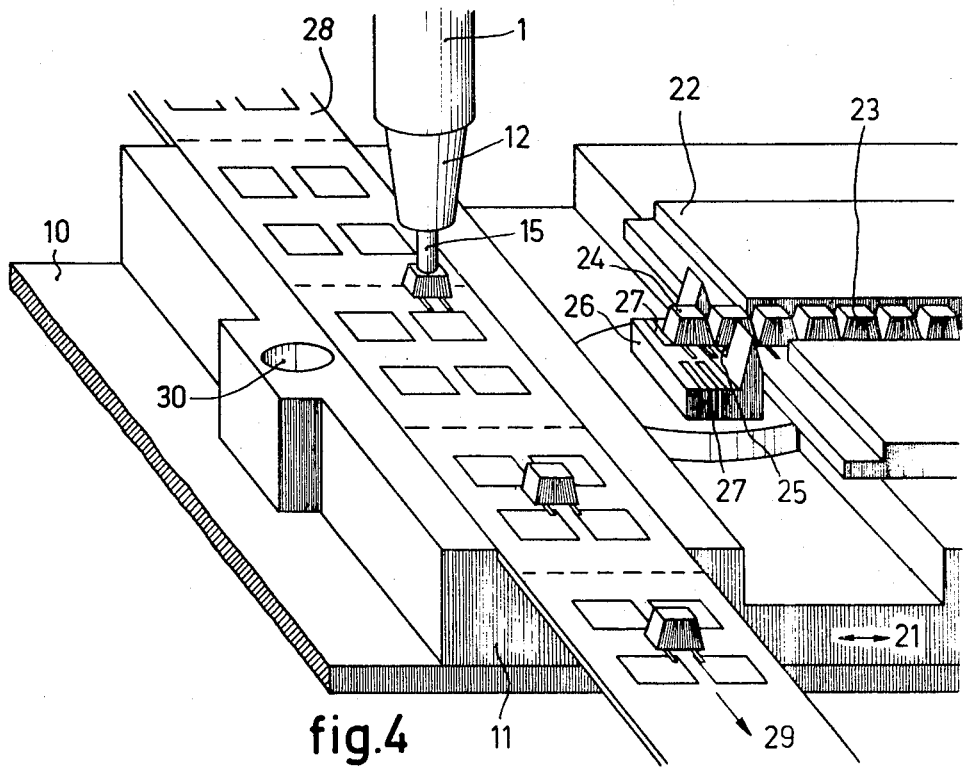
fig.4
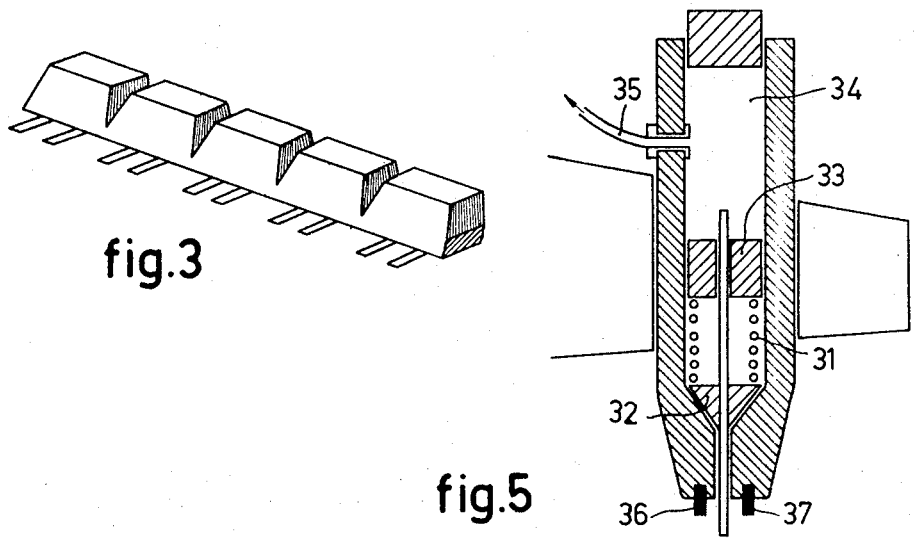
fig.3
fig.5
INVENTOR.
JOSEPH J. J. FASTRE

ULTRASONIC WELDING DEVICE WITH A SUCTION ROD FOR TREATING MICROSEMICONDUCTOR BLOCKS

The present invention relates to a device for ultrasonically welding contact conductors which project from a microsemiconductor block to the conductors on a substrate. A device of this type comprises a welding rod which is movable with respect to a workboard and which is incorporated in a holder connected to an ultrasonic generator.

Semiconductor elements are obtained nowadays in large numbers in one semiconductor disk by diffusion. They are then separated from each other, either by scratching and fracturing or by etching so that a large number of small semiconductor blocks is obtained (for example, a surface area $200\mu \times 200\mu$, and a thickness of $100~\mu$). Each block can perform a more or less complicated function. These blocks are hereinafter referred to as microsemiconductor blocks, It is obvious that these blocks are too small to be used directly and that each of them has to be secured either to a substrate with a thin-film circuit to form a component of a so-called hybrid circuit, or to a larger body or substrate having rigid supply wires, so as to be marketed as a useful product. In both cases the problem of manipulating the semiconductor blocks presents itself. The use of the so-called beam-lead semiconductor elements is particularly advantageous. These are elements in which the contact conductors of the block (for example, base, emitter, collector) do not entirely lie on the block itself but also project partly from it in the form of small beams. These beams can then be positioned directly and welded, for example, with an ultrasonic-welding rod, to the conductors of the substrate destined for that purpose. In this manner the use of thin gold wires as intermediate conductors is avoided. Since the beams project from the block, the conductors which contact each other can be seen directly during positioning without having to use infrared radiation apparatus or the like. But even when using microsemiconductors with contact conductors which project from the block, the manipulation and welding of the block is not simple.

In order to obtain a device in which the positioning and securing of the semiconductor blocks is possible, the welding rod according to the invention comprises an aperture in which a hollow needle can be moved, means being present for moving one extremity of the hollow needle out of the aperture of the welding rod to the outside over an adjustable distance. The aforesaid extremity slides into the welding rod when a force is exerted thereon which is operative opposite to the said means. At least one welding tip is arranged beside the aperture in the rod where the needle is movable, the hollow needle communicating at its other extremity with a space in which a subatmospheric pressure can be produced so that the extremity projecting from the welding rod constitutes a suction rod by means of which a microsemiconductor block can be picked up.

A particular construction of such a welding rod, and the manner in which said welding rod can be used, will now be described in greater detail, with reference to the accompanying drawing from which further advantages of the invention will become apparent. In the drawing:

FIG. 1 shows a device in which a welding rod according to the invention is used.

FIG. 2 shows the semiconductor blocks used.

FIG. 3 shows a strip of semiconductors which is particularly suitable for use in combination with the welding rod.

FIG. 4 shows a detail of an example of an automatic device in which the welding rod is used.

FIG. 5 shows a variation of the welding rod according to the invention.

FIG. 1a shows a device using an ultrasonic-welding rod and FIG. 1b shows the welding rod in detail. This rod 1 is in the form of a hollow cylinder and is clamped in a lever arm 2 which pivots about a shaft 3 which is secured to a rigid component of the device, not shown. The lever arm 2 is coupled to an ultrasonic generator 4 which can produce an oscillation in the direction of the double arrow shown and moreover to a counter weight 5 and a platform 6 for supporting a housing 16 of a vacuum space 7. All these components also pivot about the shaft 3. By rotating a cam 8, the welding rod can move towards a work board 11 under the influence of the counter weight 5. A duct 9 is connected to a vacuum pump (not shown) and to the vacuum space 7. A member 12 consisting of a material suitable for the tip of an ultrasonic-welding rod projects from he welding rod. Usually a form of $Al_2O_3$, named corundum, is used because it is a very poor electrical conductor. The member 12 is in the form of a cylinder which terminates in a truncated cone in which a slot is made so that two elongate welding tips 13 and 14 are present on either side. The member 12 is perforated and a hollow needle 15 can move up and down in the perforation. One end of said needle 15 projects from the tip of the rod whereas the other end is clamped in the housing 16 of the vacuum space 7 and opens into the space 7. The housing 16 can move upwards in an aperture of the platform 6. In the position shown the housing 16 engages the platform 6 with an abutment surface 17. By means of a first operating member, not shown, the space 7 can be made to communicate with the device for producing subatmospheric pressure so that the space 7 is evacuated, or the space 7 can be brought to atmospheric pressure by means of the operating member. So in one position of the operating member the needle 15 provides a suction effect. By means of a further operating member, not shown, the angular displacement of the cam 8 is adjusted so as to vary the height of the tip of the welding rod with respect to the workboard 11. The place where the needle 15 contacts the workboard 11 is kept in the field of view of a microscope and this is possible since the needle is relatively thin.

The workboard 11 can be adjusted by means of micromanipulator which is not shown, while sliding over a rigidly secured table 10. The substrate 18 on which the microsemiconductor blocks are to be welded and the supply substrate 19 on which said blocks are arranged freely beside each other (FIG. 2a) are furthermore shown on the workboard 11. The semiconductor blocks are of the type of beam-lead blocks (FIG. 2b) from which the contact conductors project as beams 20.

The operation of this device is as follows. The supply substrate 19 is roughly shifted below the welding rod and, looking through the microscope, the tip of the hollow needle 15 is then lowered to a point above one of the microsemiconductor blocks on the substrate 19 by means of the micromanipulator and the operating member for the cam 8. By actuating the first operating member, the block is sucked to the tip of the needle 15 and the welding rod is moved upwards. The substrate 19 is then removed from below the welding rod and the substrate 18 is moved below the rod. The block which adheres to the tip of the needle is then accurately laid on the substrate 18 by means of the microscope, the cam 8 and the micromanipulator, at the place where the contact beams 20 are to be welded to said substrate. The cam 8 is then further rotated by means of its operating member so that the whole system, which rotates about the shaft 3, is further tilted under the influence of the weight 5 after which it no longer engages the cam 8, but the tip of the rod. As a result of this needle 15 slides into the rod and since it is clamped in the member 16, the latter moves upwards relative to the platform 6. Finally the system bears on the welding tips 13 and 14 in such manner that said welding tips engage the projecting beams 20 of the semiconductor blocks with a pressure which previously had been adjusted by means of the weight 5. The vibration generator 4 is then switched on so that the contact conductors 20 are welded to the conductors of the substrate 18. Finally, the suction action of the needle 15 is discontinued by means of the said first operating member and the cam 8 is rotated by means of the second operating member. As a result of this the rod moves upwards again and releases the block. During the upward movement the needle 15 again emerges from the tip of the rod under the influence of the weight of the member 16. Due to the presence of the abutment surface 17, the needle does not project from the rod more than is necessary.

The device shown in FIG. 1 serves as an example of how to use the welding rod efficiently. So a device in which a welding rod according to the invention is used will comprise a movable workboard which provides support for the microsemiconductor blocks. The relative movement between the workboard and the rod, which is arranged above said workboard, can always be commanded by a number of operating members, but it is essential that the relative movement of the workboard in the direction in which the hollow needle can slide in and out, is controlled by one single operating member, while other operating members only influence the movements in the plane at right angles thereto. It is not necessary for this plane of movement to extend parallel to the surface of the workboard. More or less automated constructions are possible in which the movements and the processes are controlled by a program without the help of an intermediate person. In this case the problem presents itself of the accuracy of the positioning of the supplied substrates to which the blocks are to be soldered and particularly of the supplied microsemiconductor blocks. It is striking that indeed the blocks have to be positioned very accurately previously on the supply substrate 19 (FIG. 2a). MOreover, they must have been tested previously and found to be in order. This latter is no problem because, due to the suction needle, a testing operation can be included in the program, as will be described with reference to the example shown in FIG. 4.

The difficulty in positioning the supplied semiconductor blocks does not present itself when they are supplied in the form of a semiconductor strip as shown, for example, in FIG. 3. These strips are obtained by diffusing the semiconductor elements in a disk in rows and columns and not separating them then by scratching and fracturing, but just separating the rows from each other in an etching operation, as a result of which the resistance to fracture of the elements of the same row is also strongly reduced. Thus the elements of a strip are still secured together either by the silicon remaining after etching, or by a metal beam or a metal structure which was provided previously on the surface of the disk and was not etched away.

FIG. 4 shows a part of an automated device in detail. The workboard 11 can slide on the rigid table 10 only in the direction of the double arrow 21. On one side of the workboard 11, in a slot of a supply board 22, a semiconductor strip 23 is supplied until the first block 24 overhangs the edge 25. Below this block is provided a measuring substrate 26 having a number of conductors 27 which are insulated from each other and are connected to a testing apparatus (not shown) by means of conductive wire (not shown). The test apparatus provides the information whether the element to be treated is good or bad. This measuring substrate is so arranged with respect to the edge 25 of the supply board 22 that, when this block is broken from the strip by exerting pressure on the block 24, it immediately assumes the correct position on the measuring substrate. On another area of the workboard 11 a glass strip 28 is supplied in the direction of the arrow 29. Figures of vapor-deposited conductor material are present on the glass strip at fixed distances. The supply of the glass strip is effected stepwise so that at each step one figure comes under the welding rod. These Figures are arranged so that a number of rigid supply wires can be secured to each of them so that, after securing a semiconductor block, coating with synthetic resin and dividing the figures from each other, useful commercial products are obtained. Beside the part of the glass strip where the ultrasonic welding operation is carried out there is an aperture 30 in which an inferior block may be dropped by the rod 1 and thereafter sucked away, for example, to a waste tray. The welding rod 1 is of the same type as in the preceding example and comprises the member 12 of corundum through which the needle 15 extends. The mechanism by which the rod and the needle can move up and down is not shown again. The workboard 11 can move in the direction 21 and stops, by means of extremely accurate position controls, at three well-determined places in accordance with the progress of the program. The three places are: at the position where the needle is above the block 24 to be broken, above the place where the block is to be welded to the glass strip 28, and above the waste aperture 30.

At the beginning of the program the rod 1 is positioned above the block 24 and the following operations are successively carried out:

rod 1 is lowered so that the block 24 is broken from the strip 23 and is placed on the measuring substrate 26, the needle sliding into the rod as a result of the pressure on the tip of the rod, the corundum member 12 pressing the contact conductors of the block against the conductors 27 on the measuring substrate.

testing of the transistor (corundum is not conductive) and starting the suction operation of the needle.

rod 1 moves upwards and sucks along the block 24.

in the case of a good transistor:

the workboard 11 moves and stops when the needle 15 is above the place where the contact conductors of the blocks are to be welded to the glass strip (position shown). The strip 23 moves one step.

the rod 1 is lowered so that the block is placed on the glass strip 28, the needle slides into the rod and the corundum block 12 presses the contact beams against the corresponding conductors on the glass strip.

starting the ultrasonic vibration generator and stopping the suction action of the needle.

the rod 1 moves up again the workboard 11 moves and stops in the initial position while the glass strip moves one step.

in the case of a bad transistor:

the workboard 11 moves and stops in the position where the needle is above the aperture 30;

stopping the suction action so that the block falls into the aperture;

return of the workboard to its initial position.

Due to the use of the semiconductor strip, the problem of the positioning of the supplied semiconductor blocks is thus solved. Independent hereof and of the automation of the apparatus, the possibility exists, as compared with the previous example, of performing the tests with the same apparatus as that with which the contact conductors of the blocks are welded so that each block need be handled only once for testing and welding in one apparatus.

After the explanation of the various processes to be carried out the advantage of the invention is apparent. By using a welding rod having a tip which is provided with a slidable suction needle, at most only three positioning operations are to be carried out: one for picking up the block, one for testing the block and one for placing the block on the thin-film substrate. In the case of individual testing and welding, many more positioning operations are necessary: placing on a measuring block, providing a mark on the inferior blocks, picking up, placing the block on the thin-film substrate, placing the welding tip.

The device according to the invention is not restricted to the example shown. For example, the force by which the needle comes out of the rod may be effected by spring force or air pressure instead of by gravity and for the suction operation it is sufficient for the perforation in the needle to communicate with a space in which a subatmospheric pressure prevails. Alternatively, the corundum block may be divided into several blocks which can each contact one of the contact beams and thus each constitute a welding tip. Other suitable materials may also be used but if the rod is also used for pressing the block against the measuring substrate, this material should be electrically insulating. For example, a welding rod as shown in FIG. 5 may be used which is also clamped in a body which can be vibrated by the ultrasonic generator. When exerting pressure on the needle it slides into the rod so that a spring 31 is compressed under the influence of a cone 32 which is secured to the needle. The force of the spring is adjusted by the depth at which a stop member 33 is pressed or screwed into the perforation of the rod. The needle slides through an aperture in the said stop member and opens into a space 34 which, through a tube 35, can communicate at a space with subatmospheric pressure. At the tip of the rod, around the aperture through which the needle can slide, two welding tips 36 and 37 are secured. In constructing a variation of the welding rod according to one of these examples, it should always be ensured that the construction is such that the components themselves are not welded together ultrasonically. This can be avoided by ensuring that there are as few contact surfaces as possible which are in parallel with the direction of vibration and by using a relatively large surface so that the contact pressure can distribute throughout the surface.

Types of semiconductor blocks other than that shown in FIG. 2b may be used. Other forms of semiconductor blocks are possible, provided that the construction of the welding tips, measuring substrates and substrates where the block is welded are taken into account. It is essential, however, that the contact conductors project from the block and that the block has a comparatively smooth upper surface so that it can be retained by the suction needle.

I claim:

1. An ultrasonic welding device for ultrasonically welding contact conductors which project from a microsemiconductor block to the conductors on a substrate comprising, an ultrasonic generator, a welding rod which is movable relative to a workboard and which is incorporated in a holder connected to said ultrasonic generator, a hollow needle member, said welding rod having an aperture that extends to the welding tip and in which said hollow needle is movably supported, means for moving one end of the hollow needle out of the aperture of the welding rod beyond the welding tip over an adjustable distance, said end of the needle being slidable back into the welding rod under the influence of a force acting opposite to said moving means, means for coupling the other end of the hollow needle with an enclosed space in which a subatmospheric pressure can be developed so that the end of the needle projecting from the welding rod constitutes a suction rod which can hold a microsemiconductor block.

2. A device as claimed in claim 1 wherein the welding rod is arranged above the workboard, said device further comprising a first operating member for adjusting the distance between the welding rod and said workboard in the direction in which the needle slides into the rod, and one or more operating members for adjusting the relative position of the welding rod and the workboard in a plane at right angles to the said direction.

3. A device as claimed in claim 1 wherein the workboard further comprises a measuring substrate having conductors which are adapted to be connected to a measuring apparatus for testing the microsemiconductor block to be treated, said conductors being located on the upper side of the substrate in a configuration which corresponds to the positioning of the conductors on the microsemiconductor block.

4. A device as claimed in claim 2, characterized in that the workboard further comprises a supply board having a slot in which a semiconductor strip can be moved so as to overhang the edge of said supply board at a point aligned with the welding tip.

5. A device as claimed in claim 1 wherein said welding tip is at least partly composed of electric-insulating material and said ultrasonic generator is arranged to vibrate the welding tip at right angles to the longitudinal axis of the welding rod.

6. An ultrasonic welding device comprising a work support, an elongate-welding rod having a longitudinal channel extending to the welding tip, said support and rod being relatively movable, a hollow needle member coaxially and movably supported within said channel so that one end of the needle extends beyond the end of the welding tip, said needle being retractable into the welding rod channel when a force is exerted on the exposed end, means for coupling the other end of the needle to a source of suction, and means for imparting ultrasonic vibrations to the welding rod.

7. A device as claimed in claim 6 further comprising means for moving said support in discrete steps in a plane perpendicular to the axis of the welding rod.

8. A device as claimed in claim 6 further comprising a single operating member for adjusting the movement between the welding rod and the support in the direction of the longitudinal axis of the welding rod.

* * * * *